LE ROY K. KINGSLAND.
FLY CATCHING APPARATUS.
APPLICATION FILED MAY 4, 1912.
1,071,620.
Patented Aug. 26, 1913.
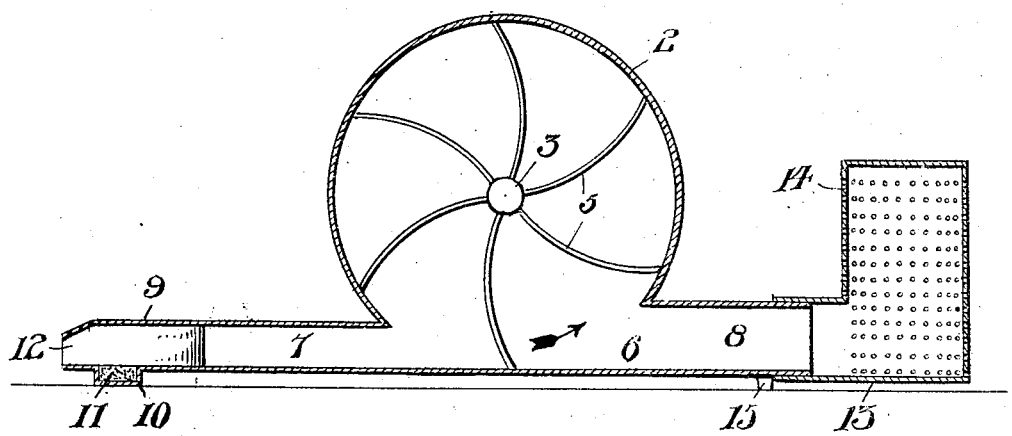
FIG. 1
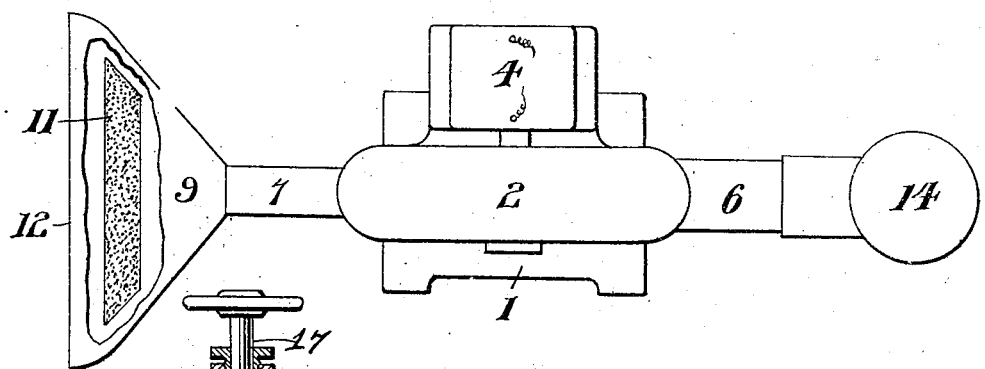
FIG. 2
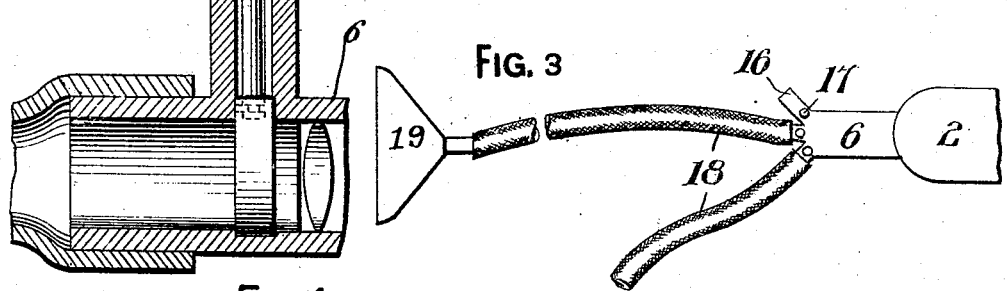
FIG. 3
FIG. 4.
WITNESSES
INVENTOR
Le Roy K. Kingsland
BY
ATTORNEYS

UNITED STATES PATENT OFFICE.

LE ROY K. KINGSLAND, OF GROVETON, PENNSYLVANIA, ASSIGNOR OF ONE-HALF TO BERNARD TESS, OF PITTSBURGH, PENNSYLVANIA.

FLY-CATCHING APPARATUS.

1,071,620.

Specification of Letters Patent. Patented Aug. 26, 1913.

Application filed May 4, 1912. Serial No. 695,272.

*To all whom it may concern:*

Be it known that I, LE ROY K. KINGSLAND, a citizen of the United States of America, residing at Groveton, in the county of Allegheny and State of Pennsylvania, have invented certain new and useful Improvements in Fly-Catching Apparatus, of which the following is a specification, reference being had therein to the accompanying drawing.

This invention relates to a fly catching device, and the primary object of my invention is the provision of novel means for attracting flies and other insects and entrapping the same, whereby the flies or insects can be destroyed.

Another object of this invention is to utilize a motor operated fan for producing a suction that will draw flies and other insects into a suitable receptacle from which they cannot escape.

A further object of this invention is to provide a fly trap that has a plurality of branches, the trap being simple in construction, positive in its operation, and highly efficient for the purposes for which it is intended.

With the above and other objects in view the invention resides in a novel construction, combination and arrangement of parts to be hereinafter specifically described and then claimed.

Reference will now be had to the drawing, wherein:—

Figure 1 is a longitudinal sectional view of a trap in accordance with this invention. Fig. 2 is a plan of the same partly broken away. Fig. 3 is a plan of a portion of the trap provided with branches. Fig. 4 is an enlarged sectional detail.

The reference numeral 1 denotes a base plate supporting a cylindrical fan casing 2 and arranged concentrically of the casing 2 is a motor or armature shaft 3 that is revolved by a motor 4 located upon the base plate 1 at one side of the casing 2. The shaft 3 within the casing 2 is provided with a plurality of radially disposed curved blades 5, said blades being equally spaced and extending into proximity to the inner walls of the casing 2.

The bottom of the casing 2 is in communication with the longitudinal pipe 6, said pipe providing an inlet conduit 7 and an air outlet conduit 8. The upper end of the pipe 6 is in communication with an integral funnel shaped head 9 and the bottom of said head is provided with an oblong holder 10 for a bait 11, as sugar or any other substance that will attract flies or insects and entice the flies to enter the open end 12 of the head 9.

Mounted upon the rear end of the pipe 6 is a sleeve 13 that is in communication with the lower end of a cylindrical perforated receptacle 14. The rear end of the pipe 6 is provided with support 15 that coöperates with the base plate 1 and the bait holder 10 in supporting the trap in a horizontal plane upon a suitable support.

By reference to Fig. 3 of the drawing, it will be observed that the forward end of the pipe 6 is provided with nipples 16 having valves 17 of the ordinary and well known type, whereby a nipple can be closed when not in use. Mounted upon the nipples 16 are flexible conduits 18, preferably in the form of hose. The outer ends of the flexible conduit 18 are provided with heads 19, similar to the head 9.

In operation, the fan produces a suction within the pipe 6, and flies or insects at the mouth of the head 9 will be immediately sucked or drawn through the pipe 6 into the receptacle 14. The receptacle 14 can be removed from time to time and thoroughly cleaned.

What I claim is:—

A fly catching device comprising an outlet and an inlet pipe, a fan casing communicating therewith, a receptacle into which said outlet pipe discharges, a fan operable within said casing, a horizontally disposed flat flaring suction head communicating at its reduced end with said inlet pipe, said suction head having its bottom wall formed with a transverse opening, a bait holder integral with and depending from the lower end of said bottom wall and communicating with said opening, said bait holder forming
5 a support for said suction head, and a bait mounted in the holder and extending into said opening.

In testimony whereof I affix my signature in the presence of two witnesses.

LE ROY K. KINGSLAND.

Witnesses:
CHAS. H. STEVENSON,
C. J. CULLEN.

Copies of this patent may be obtained for five cents each, by addressing the "Commissioner of Patents. Washington, D. C."